Nov. 2, 1954     A. D. F. MONCRIEFF     2,693,133
LOADING MECHANISM

Filed Oct. 1, 1948     4 Sheets-Sheet 2

INVENTOR.
Alexander D. F. Moncrieff
BY
Harness, Dickey & Pierce
ATTORNEYS.

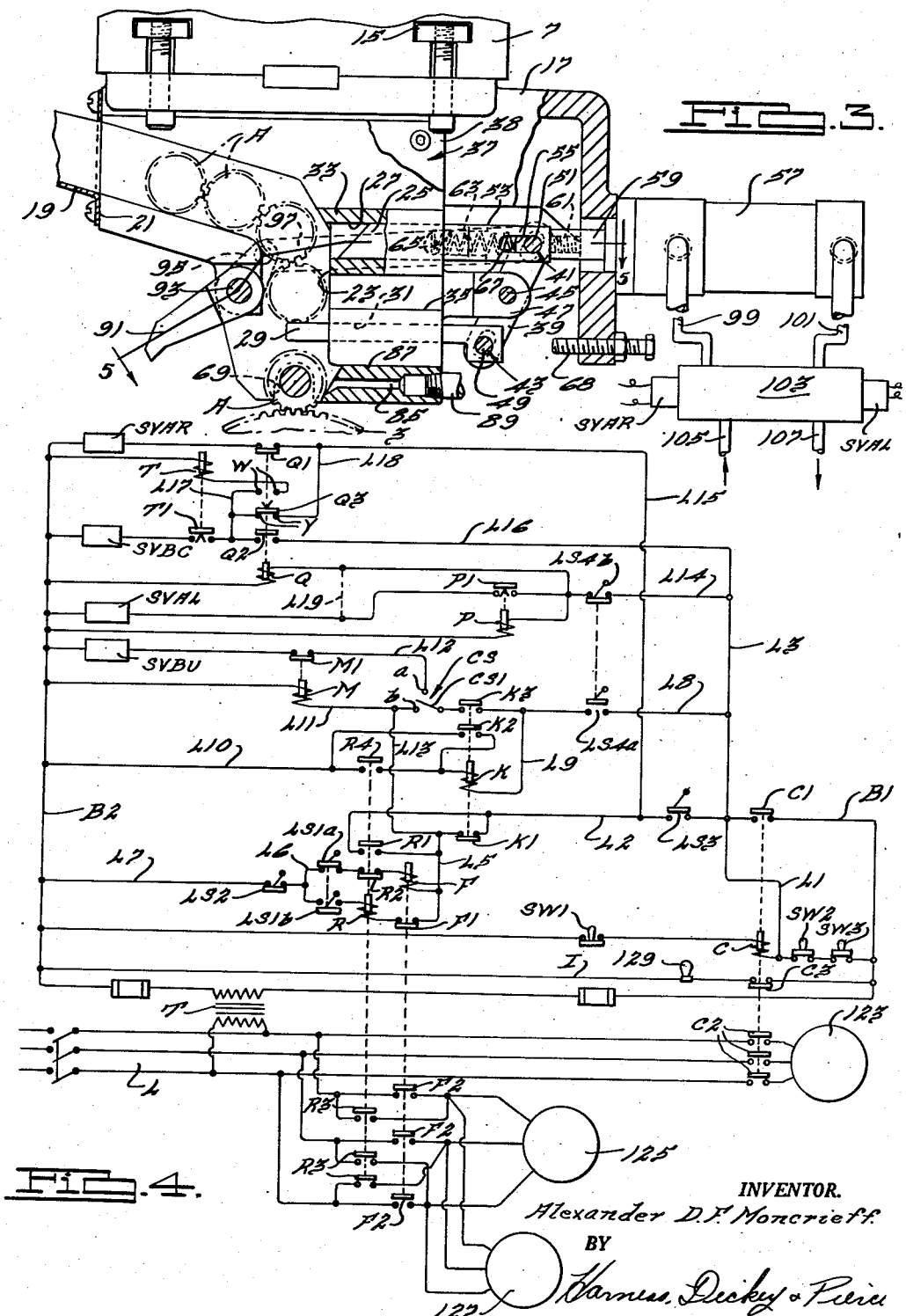

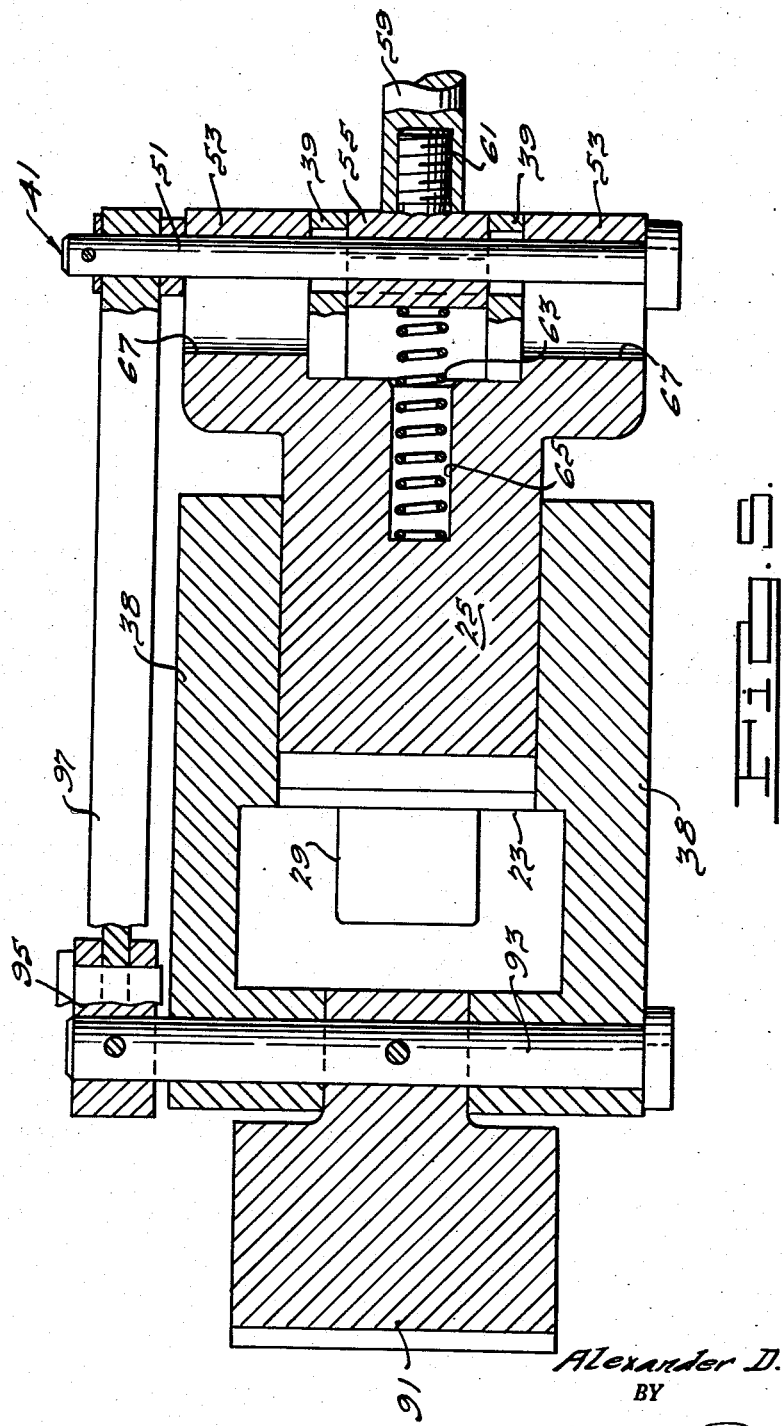

United States Patent Office

2,693,133
Patented Nov. 2, 1954

2,693,133

LOADING MECHANISM

Alexander D. F. Moncrieff, Detroit, Mich., assignor to Michigan Tool Company, Detroit, Mich., a corporation of Delaware Application October 1, 1948, Serial No. 52,388

6 Claims. (Cl. 90—1)

This invention relates to feed or loading mechanism, the present application being a continuation-in-part of the inventor's application Serial No. 33,369, filed June 16, 1948, entitled "Feed Mechanism," now Patent No. 2,649,032, August 18, 1953. The devices disclosed in each of these related applications are especially adapted for use with the machine disclosed in application Serial No. 6,488 entitled "Gear Shaving Machine," filed jointly on February 5, 1948, by the present inventor and James Martin, and now abandoned, and from this usage of the applicant's feed mechanisms others will be apparent to those in the art.

The main objects of this invention, like those of the invention described in the parent application, are to provide a feed mechanism which is capable of holding a large number of articles and of intermittently delivering a predetermined number thereof to a place for treatment and which is capable of delivering and positioning articles for treatment and of removing them after treatment. The present invention also provides an automatic control circuit which may be used with the mechanism described herein or with that shown in the aforementioned copending applications.

Other objects and features of the invention will appear upon consideration of the accompanying drawings showing the invention embodied in a gear shaving machine constructed in accordance with the teachings of application Ser. No. 6,488 and in which:

Fig. 3 is an enlarged side elevation of the loading mechanism with parts in section and parts broken away;

Fig. 4 is a line diagram of an automatic operating circuit for the loading mechanism and gear shaving machine.

Fig. 5 is an enlarged section taken along the line 5—5 of Figure 3.

Figure 1:
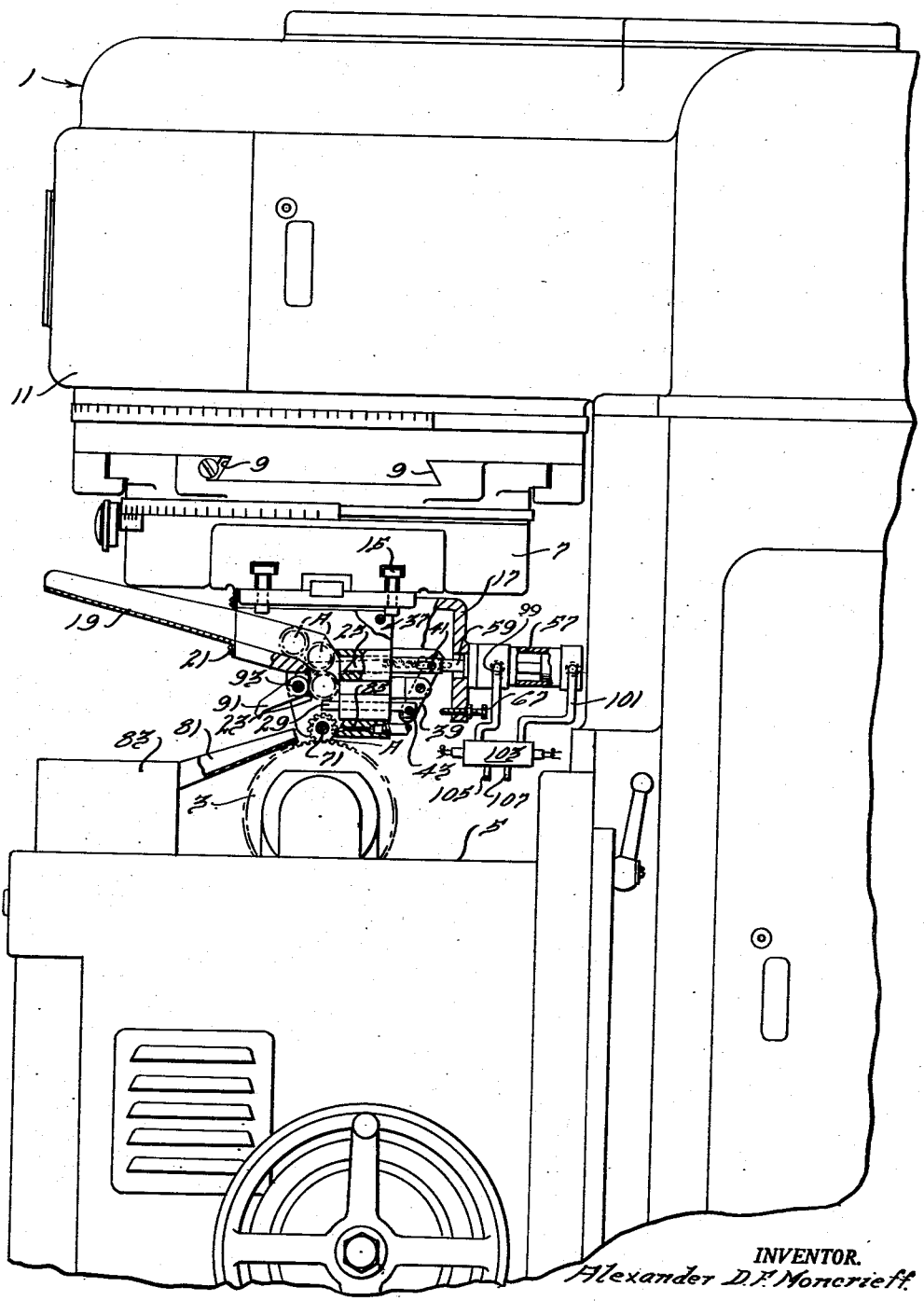
Fig. 1 is a side elevation partly in section and with parts broken away of a gear loading mechanism embodying the principles of the invention.
Figure 2:
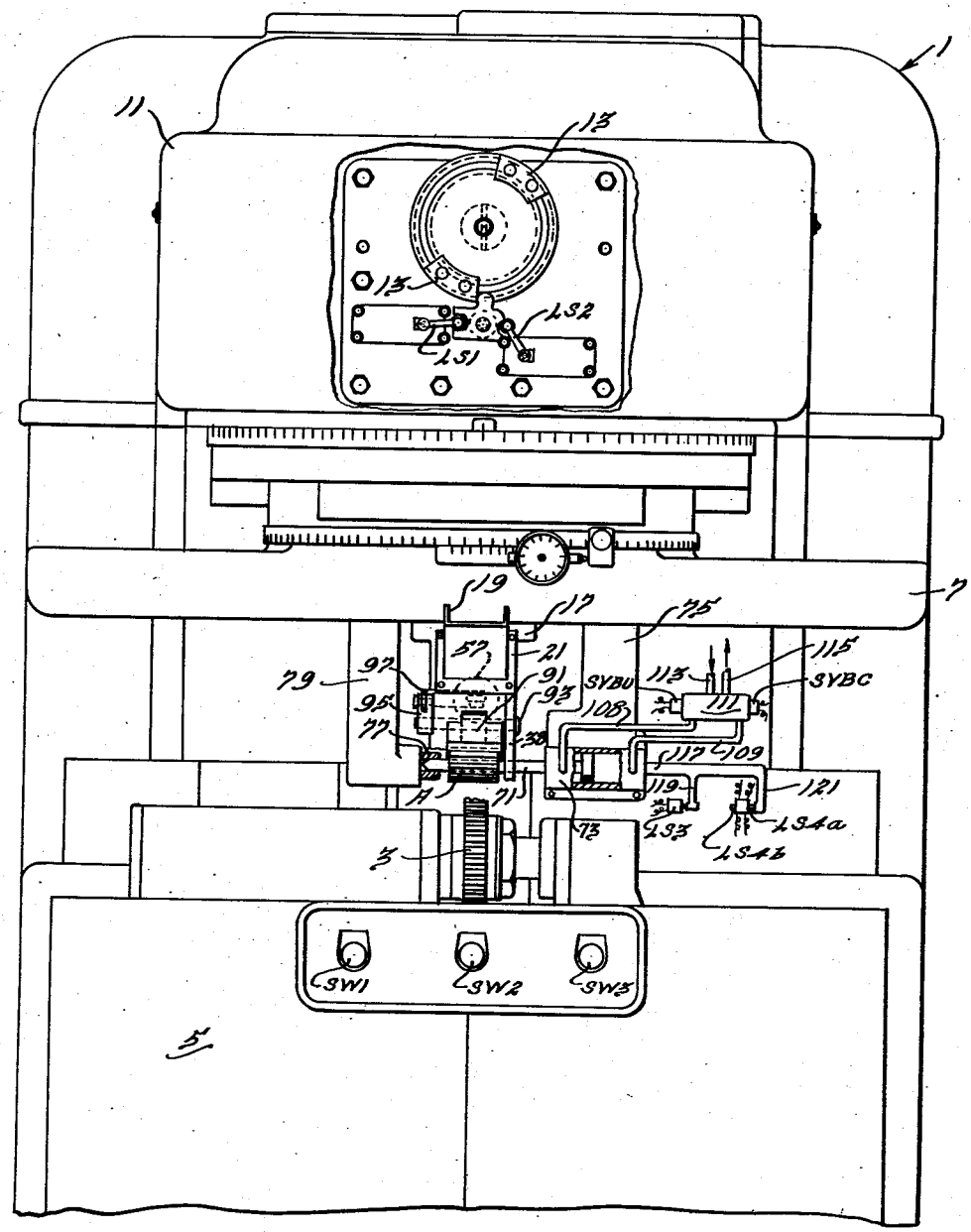
Fig. 2 is a front elevation of the structure shown in Fig. 1.

The gear shaving machine 1 which is shown in Figs. 1 and 2 is described in detail in said application Ser. No. 6,488. This machine has a rotary cutter 3 which is mounted on a carriage 5 which, for the purpose of this invention, may be regarded as fixed in position. The gears A to be shaved are mounted on a slide 7 which reciprocates on the dovetail ways 9 extending below the fixed head 11. The limits of reciprocation of the slide 7 are controlled by a two-way limit switch LS1 (Fig. 2) which is actuated by a pair of circumferentially spaced rotary cams 13 and limit switch LS2 is provided as a safety feature to stop traverse movement of the slide in the event the switch LS1 fails to reverse the directions of reciprocation.

The loading mechanism, except the discharge chute, is affixed to the underside of the slide 7 by suitable means such as T bolts 15 through the frame 17. A downwardly inclined feed or hopper chute 19 is affixed to the frame 17 by a mounting plate 21 and is adapted to hold a plurality of gears A. The chute 19 preferably has a substantially vertical throat 23 which is in alignment with the top of the cutter 3, and which may be considered as either a part of the feed chute 19 or a delivery chute fed thereby.

Passage of gears from the chute 19 into the throat 23 and from the throat 23 onto the cutter 3 is under the control of two vertically spaced plates. The upper plate 25 is slidable in a slot 27 and the lower plate 29 is slidable in a slot 31, these slots being transverse to the throat 23 and formed in horizontal web sections 33 and 35, respectively, of the member 37 which has vertical side plates 38 by which it is attached to the frame 17. When it is in an advanced position, the upper plate 25 acts as a restraining means to prevent the passage thereby of gears in the chute 23. When the plate 29 is in an advanced position, it acts as a closure for the delivery chute 23 to prevent gears which have passed the throttle plate 25 from reaching the cutter 3.

The plates 25 and 29 are interconnected for simultaneous movement in opposite directions by means of a pair of side links 39 which are pivotally connected at their ends to each plate, as shown at 41 and 43, respectively, and are each pivotally mounted in a central portion 45 to a transverse bracket 47 affixed to the member 37. Pivotal connection 43 preferably comprises a pin 49 passing transversely through an aperture near the end of the plate 29 and through suitable slotted apertures in the side links 39. The pivotal connection 41 preferably includes a pin 51 which passes through suitable slotted apertures in the links 39 and in the spaced legs 53 of the bifurcated end portions of the plate 25. A block 55 is movably fitted between the legs 53 and has a transverse bore through which the pin 51 extends.

Forces for moving the plates 25 and 29 are preferably provided by a pressure fluid cylinder 57 which may be affixed to the frame 17. The piston rod 59 of the cylinder 57 may be threadably connected to a suitable extension 61 on the block 55 so that any movement thereof is transmitted to the pivot pin 51 and thus to the link 39 to move the plate 29. It is also transmitted to the legs 53 to move the plate 25 against a yieldable resistance. A spring 63 is seated in a bore 65 in the plate 25 and bears upon the block 55 to yieldably resist advance of the piston rod 59. The spring 63, in combination with the slots 67 in the legs 53 in which the pin 51 slides, provides a cushioning effect when the plate 25 is advanced against a gear in the throat 23. An adjusting stud 67 may be threadably mounted in the frame 17 in alignment with the plate 29 to limit retraction thereof and thus advance of the plate 25.

The lower ends of the sides of the hopper throat 23 are preferably provided with a slotted cutout 69 to permit passage of the reciprocable arbor 71 (Fig. 2) which is adapted to releasably support the gear in operative relationship to the cutter 3 during the shaving operation. The arbor 71 forms the piston rod of the pressure fluid cylinder 73 which is mounted on the slide 7 by means of a suitable bracket 75. When the arbor is advanced to clamp a gear in position for shaving, its extreme end seats in a bearing recess 77 formed in a bracket 79 on the opposite side of the hopper. When the arbor is retracted, the gear is held by the side of the chute throat 23 and, upon complete withdrawal of the arbor 71, falls into a discharge chute 81 which delivers it to a bin 83, these elements being mounted on the carriage 5, as shown in Fig. 1.

The forces for moving the shaved gear into the chute 81 may be provided in any desired manner. For example, the cutter may be rotated a slight amount after the arbor is withdrawn to drive the freed gear toward the chute 81. Jets of cutting fluid directed toward the chute 81 may be provided through the medium of passages 85 in a web 87 in the member 37 which are fed from a suitable source through the conduit 89. A further means for forcing gears into the chute 81 is shown in the copending application Serial No. 33,369 wherein the gears are held in a position which is slightly on the chute side of a vertical plane through the cutter 3 whereby the force of gravity drives unclamped gears into the chute 81.

In the present application of the invention, the vertical space in the throat 23 between the plates 25 and 29 preferably accommodates no more than one gear. When the piston rod 59 is advanced, the resulting retraction of plate 29 allows this gear to fall onto the top of the cutter 3. At the same time, a positioning arm 91 is actuated to hold the fallen gear in place on the cutter 3 until the arbor 71 advances to clamp it in position. The arm 91 is pivotally connected to the sides 38 of the member 37 by means of sidewise trunnions 93. A crank 95 is fixed to a trunnion 93 and is pivotally connected to the pin 51 by means of a link 97. Thus, when the piston rod 59 and pin 51 are advanced, the arm 91 is pivoted downwardly to block movement of the released gear toward the chute 81. During this period the plate 25 is advanced to prevent any other gears in the hopper chute 19 from passing through the delivery chute 23. When the arbor has been inserted into the bore of the gear which rests on the cutter 3, the cylinder 57 is actuated to withdraw the piston rod 59. This retracts the plate 25 and allows the gears in the chute 19 to fall downwardly so that the next gear to be shaved rests on the plate 29 which is advanced into the throat 23 by this motion of the rod 59. As this occurs, the arm 91 is pivoted upwardly. This brings it out of the discharge path of the gear being shaved which thus slides down chute 81 into the bin 83 when the arbor 71 is withdrawn after shaving, in a manner which has already been indicated.

The pressure cylinders 57 and 73 which have been described herein correspond to the cylinders 65 and 19, respectively, of the applicant's copending application Serial No. 33,369 and control means are herein provided for synchronizing their actuation with the reciprocation of the slide 7. During the shaving operation, the slide 7 is reciprocated through one cycle; i. e., outwardly and return, and then stopped. As indicated hereinbefore, it preferably carries with it all of the parts so far described except the discharge chute 81 and bin 83.

Before the cycle is commenced, the cylinder 57 is actuated to advance its rod 59 so as to lower the arm 91 and allow a gear to drop into place on the cutter 3. This movement of the rod is caused by exhausting pressure fluid from the cylinder through conduit 99 and admitting it to the opposite side of the piston through conduit 101. Such control of the conduits 99 and 101 may, among various methods, be conveniently accomplished through the medium of the solenoid actuated four-way valve 103 to which they are connected in a conventional manner. The solenoid SVAL is adapted to switch the spool of valve 103 so that the pressure line 105 communicates with conduit 101 and the exhaust line 107 communicates with conduit 99. Thus, when solenoid SVAL is energized the arm 91 is lowered and a gear is positioned on the cutter.

When the gear is positioned on the cutter, the cylinder 73 is actuated to advance the arbor 71 through the bore of the gear to clamp it in position for shaving. This movement of arbor 71 is caused by exhausting fluid from the cylinder 73 through conduit 108 and admitting it to the opposite side of the piston through conduit 109. Such control of the conduits 108 and 109 may be conveniently accomplished through the medium of the solenoid actuated four-way valve 111 to which they are connected in a conventional manner. The solenoid SVBC is adapted to switch the spool of valve 111 so that the pressure line 113 communicates with conduit 109 and the exhaust line 115 communicates with conduit 108. Thus, when solenoid SVBC is energized the arbor 71 is advanced to clamp the gear in position for the shaving operation.

When the gear has been clamped in position by the arbor 71, the shaving operation is ready to begin. This involves starting the cutter 3, reciprocating the slide 7, and raising the arm 91 by energizing solenoid SVAR and de-energizing solenoid SVAL of valve 103. To initiate these various actions, the arbor 71 has a rod end 117 which extends out the opposite side of the cylinder 73 and is there provided with the axially spaced fingers 119 and 121. The finger 119 is adapted to close the normally open limit switch LS3 and the finger 121 to close the "a" side of the two-way limit switch LS4 when the gear is clamped in position. These switches control circuits to be presently described so that when actuated in this manner they act in conjunction with the limit switch LS1 and a centrifugal switch CS, which is connected to the motor driving the cutter 3, to retract the rod 59 in cylinder 57, to move the slide 7 through one cycle, to change the direction of rotation of the cutter 3 when the slide 7 reverses direction, and after the cycle is completed to energize SVBU and de-energize SVBC so as to retract the arbor 71 and unload the shaved gear. When the arbor 71 is retracted, the finger 119 engages the "b" side of switch LS4 which energizes SVAL to lower the arm 91 and load a new gear on the cutter 3. After a brief delay, the solenoid SVBC is energized to advance the arbor and clamp the gear in position.

As will be apparent from the following circuit, the cutter motor is jogged when the gear is loaded so that the teeth thereof mesh properly with the teeth of the cutter 3. It may also be jogged when the gear has been unclamped to drive it into the unloading chute 81.

As shown in Fig. 4, a three phase line L may be used to furnish power for the machine and this has the coolant motor 123 suitably connected thereto. The traverse motor 125 for reciprocating the slide 7 and the cutter drive motor 127 are also interconnected with the line L and with each other in such a manner that they reverse direction simultaneously, this reversal being under the control of relay actuated switches to be presently described.

The control circuit itself may receive power from the buses B1 and B2 which receive power from the line L through the transformer T. A control relay C is connected across the lines B1 and B2 and has the normally open switches SW2 and SW3 and the normally closed switch SW1 in series therewith, these switches being on the front of the machine as shown in Fig. 2. The relay C controls the normally open switch C1 in the line B1, the normally open switches C2 in the line L before the coolant motor 123, and the normally closed switch C3 in a line I which connects the indicating lamp 129 across the lines B1 and B2.

Three lines, L1, L2, and L3 are connected to the bus B1 at a point just beyond the switch C1 and thus under its control. The line L1 is connected on the open switch SW2 side to the relay C so that after the relay C has been energized by pressing of switches SW2 and SW3 to close switch C1, subsequent release of these push button switches will not de-energize relay C. The line L2 furnishes power to a circuit for controlling reciprocation of the slide 7 and reversal of the motors 125 and 127. The line L3 furnishes power to relays for synchronizing the various operations involved.

The limit switch LS3, previously described in connection with Fig. 2, controls line L2. This switch is closed when the gear is clamped in position by the arbor 71. The line L2 furnishes power to the conductor L5 for the energizing windings of the relays R and F through either the normally open switch R1 controlled by the relay R or the normally closed switch K1 controlled by a relay K to be later described. The conductor L5 is connected to the energizing winding of the relay F and a line L6 leading from this winding has a normally closed switch R2, actuated by relay R, and one side of the two-way limit switch LS1 therein and is then connected to the safety limit switch LS2. The line L5 is also connected to a normally closed switch F1, actuated by relay F, and this switch is connected to the energizing winding of the relay R and then through the other side of the two-way limit switch LS1 to the safety limit switch LS2. The line L7 connects the switch LS2 to the bus B2. The relay F controls switches F2 in the line L connections to the traverse motor 125 and cutter motor 127 and relay R controls reversing connections R3 to these motors. It will be recognized that by this arrangement the relays R and F are alternately energized and that such alternate energization results in reversal of the motors 125 and 127.

A line L8 is connected to the bus line L3 and contains the "a" side of the limit switch LS4, this side being closed by finger 121 when the gear is clamped in position. A line L9 connects the line L8 to the energizing winding of the relay K. This winding is connected to the bus B2 by a line L10 which contains the normally open switch R4 that is actuated by relay R. A by-pass or holding line L10a around the switch R4 is controlled by the switch K2 which is actuated by relay K so that when once energized this relay is not de-energized until the "a" side of switch LS4 is opened.

The line L8 is connected through a normally open switch K3 that is controlled by relay K to the rotary contact arm CS1 of a centrifugal switch CS which is actuated in a well-known manner by the cutter motor 127. When this motor is at a predetermined speed, the contact CS1 connects the line L8 to the contact "b" of line L11 which is connected through the energizing winding of a relay M to the bus B2. When the motor falls below said speed, the rotary contact CS1 engages the contact "a" of line L12 which is connected to one side of the normally closed switch M1 which is actuated by the relay M. The other side of the switch M1 is connected to the solenoid SVBU which is connected to the bus B2. A point in line L11 between the relay M and contact "b" is connected by line L13 to the line L5 so that this relay may be energized when the motor 127 is operating.

The "b" side of limit switch LS4 controls the line L14 which is connected to the bus line L3. The energizing winding of the relays P and Q are connected to the bus B2, and across LS4b through line L14 to line L3. The solenoid SVAL is likewise connected to bus B2 and across LS4b to line L3 but this circuit is under the further control of the normally open time delay switch P1 which closes a predetermined time after P is energized.

A line L15 is connected to line L2 and is under the control of the limit switch LS3. This line has a normally closed switch Q1 which is actuated by the relay Q and is then connected through the solenoid SVAR to the bus B2.

A line L16 is connected to the line L3 and contains a normally open switch Q2 which is controlled by the relay Q. A conductor L17 is connected to line L16 just beyond the switch Q2 and this is connected through a pair of normally open contacts W through the winding of relay T to the bus B2. A shunt line L18 connects the line L17 to line L15 at a point before the contacts W. The line L18 has contacts Y which are normally closed by a time delay switch Q3 that is actuated by the relay Q. The switch Q3 opens contacts Y a predetermined time after the relay Q is energized whereupon it closes the contacts W in line L17 to energize relay T. The solenoid SVBC is connected to the normally open contacts of the time delay switch T1 which is closed a predetermined time after relay T is energized thus connecting the solenoid SVBC to the contacts of switch Q2 and to contacts Y.

In starting the machine, it will be assumed that the hopper chute 19 contains several gears A and the throat 23 a gear which rests on plate 29 and that the arbor 71 is retracted. With the machine in this condition and the line L energized, the lamp 129 glows indicating that relay C is de-energized. Upon pressing switches SW2 and SW3, the relay C is energized to open switch C3 and shut off the light 129 and to close switches C2 to start up the coolant motor 123. Switch C1 is also closed to energize lines L3 and L1, the latter holding the relay C in energized condition.

The limit switch LS4b is closed by the retracted arbor finger 119 so that the relays P and Q are connected across the line L3 and the bus B2. This opens switch Q1 to de-energize solenoid SVAR and after a brief delay switch P1 closes to energize solenoid SVAL to lower the arm 91 and drop the gear in the throat 23 onto the cutter 3. Switch Q2 is also closed as are the contacts Y by the switch Q3 which is acting under a time delay. The line L15 is therefore connected to the line L3 through these switches and the line L18. Current can therefore flow through them and through switch K1 to line L5. In the position of rest of slide 7, the "a" side of switch LS1 is closed by the cam 13 so that the relay F is connected to the bus B2 and is therefore energized. This closes the switches F2 to briefly jog the motor 127 so that the gear falls into proper engagement with the teeth of the cutter 3. As soon as the time delay of switch Q3 expires, the contacts Y are opened, F is de-energized and the motor 127 stops. The gear is then held by arm 91 in position to receive the arbor 71.

When Q3 opens contacts Y, it closes contacts W to energize relay T. After a brief delay during which the gear settles on the cutter 3, the switch T1 closes to energize solenoid SVBC which advances the arbor 71 to clamp the gear in position, solenoid SVBU being de-energized due to open contacts at LS4a and LS3.

As the arbor 71 moves to clamp the gear, the finger 119 releases the "b" side of switch LS4 to de-energize relays P and Q and the solenoid SVAL. This allows switch Q1 to close and when the finger 119 closes switch LS3 the solenoid SVAR is energized to raise the arm 91 and move the plates 25 and 29 in the desired directions.

Closure of switch LS3 allows current to flow through closed switch K1 to the line L5 to energize relay F again. This energizes the motors 125 and 127 which moves the slide 7 outwardly and drives the cutter motor 127. When the cutter is up to speed, the rotary contact CS1 engages contact "b" of line L11.

When switch LS3 is closed, the finger 121 closes the "a" side of switch LS4. This has no effect until the "b" side of LS1 is closed by cam 13 to energize relay R and de-energize relay F which closes switches F1 and R3 and opens switches F2 and R2 to reverse the motors 125 and 127. Energized relay R also closes switch R4 which energizes relay K. This opens switch K1 but current is by-passed around it through the switch R1 which is closed. Energization of relay K also closes switch K2 to provide a by-pass around switch R4 and closes switch K3 to connect the rotary switch arm CS1 to the line L3. During reversal of the motors, the switch arm CS1 momentarily falls on to contact "a" but this fails to energize solenoid SVBU because the solenoid M is energized through line L13 to open its switch M1 in line L12.

The slide 7 is now returning to its original position and when it reaches it the cam 13 opens the "b" side of switch LS1 to de-energize relay R. This opens switch R1 and since switch K1 is already open the circuit through line L5 is broken and the switches R3 and F2 open to stop the motors 125 and 127.

When the cutter motor 127 drops below a predetermined speed, the rotary switch CS1 falls to contact "a" on line L12. This de-energizes relay M and closes switch M1 so that solenoid SVBU is energized. Since solenoid SVBC is de-energized at this time due to the fact that switch LSB4b is open, the arbor 71 is retracted from the gear which has just been shaved.

Retraction of arbor 71 first opens switch LS3, which has no immediate effect, and then opens the "a" side and closes the "b" side of switch LS4. This energizes the relays P and Q and, after a delay determined by the closing of switch P1, energizes the solenoid SVAL in a manner which has already been described. Due to the fact that the relay Q is connected to line L14 between the switches LS4b and P1, its switch Q2 is immediately closed to jog the motor 127 and help drive the shaved gear into the chute 81. If it is not desired to furnish this assistance in discharging the gear, the solenoid Q could be connected instead by a line L19 to the line L14 beyond the switch P1. With such a connection the motor 127 would not be jogged until the gear is lowered through the agency of solenoid SVAL.

It is to be understood that the invention is not strictly limited to the specific structure herein shown and described but comprehends various modifications such as may appear to those in the art.

What is claimed is:

1. In a gravity loading device for a gear shaving machine or the like having a cutter, the combination of a hopper having a vertical downwardly extending throat opening over said cutter, a pair of vertically spaced plates slidably mounted in the throat for horizontal movement across the throat and each capable of preventing the flow of gears thereby, said plates being spaced sufficiently so that the throat portion therebetween is adapted to contain no more than a predetermined number of gears, a pivotal arm for positioning gears which pass the lower of the plates, said throat opening over the top of said cutter and said positioning arm being located adjacent said throat and serving to position gears on top of said cutter and mechanical moving means interconnecting the plates and the arm so that when the lower plate allows passage of gears the upper plate prevents such passage and the arm is operative to position articles and when the lower plate prevents passage of gears the upper allows passage and the arm is inoperative.

2. In a gravity loading device for a gear shaving machine or the like having a cutter and an axially movable arbor passable through the bore of a gear to support it in operative position over said cutter, the combination of a hopper having a vertical downwardly extending throat opening over said cutter, a pair of vertically spaced members slidably mounted in the throat for horizontal movement across the throat and each capable of preventing the flow of gears thereby, said members being spaced sufficiently so that the hopper portion therebetween is adapted to contain only one gear, said lower member being spaced above the cutter by a distance only slightly greater than the diameter of a gear, said throat including a side portion extending downwardly beyond said lower member so that it terminates a distance above the cutter which is substantially less than the diameter of a gear, said side portion including an opening to pass said arbor and serving as a stop to prevent joint axial movement of a gear with the arbor, means for positioning gears flowing from the throat to receive said arbor, moving means for simultaneously reciprocating the plates so that one allows the flow thereby of gears, and the other prevents such flow, and operating means for the positioning means actuated by the moving means and adapted to render the positioning means operative when the lower member is positioned to permit gear flow thereby and inoperative when the lower member is positioned to prevent gear flow thereby.

3. In a gravity loading device for feeding articles to a holding means at a position of treatment, the combination of a feed chute adapted to hold a plurality of annular articles to be treated, a delivery chute adapted to receive articles from the feed chute and deliver them to said position of treatment, a closure for the feed chute capable of preventing the transfer of articles therefrom to the delivery chute, a closure for the delivery chute capable of preventing the transfer of articles therein to the position of treatment, and means for alternately opening the closures, said delivery chute having an opening in the side adjacent the bottom end thereof and smaller than an article, an arbor movable through said opening and capable of receiving and supporting said annular articles at said position of treatment, and means for moving said arbor through said opening.

4. In a gravity loading device, the combination of a feed chute, a delivery chute receiving articles from the feed chute and adapted to deliver them to a position for treatment, first means operative to prevent the transfer of articles from the feed chute to the delivery chute, second means operative to prevent articles in the delivery chute from reaching the position for treatment, means interconnecting said first and second means so that they are alternately operative, third means receiving articles from the chute and adapted to hold an article during treatment and movable to release the article after treatment, fourth means actuating operation of the first and second means to deliver an article to the position for treatment, fifth means responsive to release movement of the third means and actuating the fourth means, sixth means actuating movement of the third means to hold and release articles, seventh means responsive to completion of treatment and actuating the sixth means to effect release of the treated article, and eighth means actuated by the fifth means after actuation of the first and second means and actuating the sixth means to effect holding of the article delivered by the delivery chute, and ninth means actuating the eighth means.

5. In a gear shaving machine or the like having a rotary cutter and a reciprocable head on which the gear to be machined is mounted the combination of first means reciprocating the head, second means rotating the cutter, third means simultaneously reversing the direction of rotation of the cutter and the direction of reciprocation of the head, fourth means stopping movement of the head and cutter after a predetermined number of cycles, clamping means movable to hold a gear in operative engagement with the cutter and to release the gear, fifth means moving the clamping means to hold and release gears, a gravity feed chute adapted to hold a plurality of gears to be machined, movable means adapted in one position to prevent passage of gears from the chute and in a second position to transfer a gear from the chute to the cutter, sixth means moving the movable means to the one position and to the second position, seventh means actuating the fifth means to move the clamping means in a direction to release a gear, said seventh means including centrifugal switch means operable upon a predetermined decrease in cutter speed due to operation of the fourth means to stop the cutter, eighth means actuated by the clamping means upon release movement thereof and actuating the sixth means to move the movable means to the second position, ninth means actuated by the eighth means and actuating the fifth means to move the clamping means in a direction to hold the gear, said ninth means including means actuating it a predetermined time after the movable means is actuated to move to the second position, and tenth means actuated by the clamping means upon holding movement thereof and actuating the first and second means and the sixth means to move the movable means to the one position.

6. The invention as claimed in claim 5 including eleventh means actuated by the eighth means to briefly actuate the second means to jog the cutter.

References Cited in the file of this patent

UNITED STATES PATENTS

| Number | Name | Date |
|---|---|---|
| 366,592 | Marsh et al. | July 12, 1887 |
| 1,594,821 | Dulligan | Aug. 3, 1926 |
| 1,921,527 | Kersey | Aug. 8, 1933 |
| 1,993,754 | Smith et al. | Mar. 12, 1935 |
| 2,033,449 | Romaine et al. | Mar. 10, 1936 |
| 2,150,313 | Bauer | Mar. 14, 1939 |
| 2,320,039 | Jobert | May 25, 1943 |
| 2,340,653 | Fiegel | Feb. 1, 1944 |
| 2,382,013 | King | Aug. 14, 1945 |
| 2,398,083 | Rosengren | Nov. 13, 1945 |
| 2,433,468 | Mackmann et al. | Dec. 30, 1947 |
| 2,536,413 | Bauer et al. | Jan. 2, 1951 |